(12) United States Patent
Briesch et al.

(10) Patent No.: US 7,874,139 B2
(45) Date of Patent: Jan. 25, 2011

(54) IGCC DESIGN AND OPERATION FOR MAXIMUM PLANT OUTPUT AND MINIMUM HEAT RATE

(75) Inventors: Michael Scot Briesch, Orlando, FL (US); Terrence Blaise Sullivan, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1139 days.

(21) Appl. No.: 11/581,166

(22) Filed: Oct. 13, 2006

(65) Prior Publication Data

US 2008/0087022 A1 Apr. 17, 2008

(51) Int. Cl.
*F02C 3/26* (2006.01)
(52) U.S. Cl. .................... 60/39.464; 60/39.281
(58) Field of Classification Search ........... 60/39.464, 60/39.281, 39.511, 736, 781, 779, 776, 773, 60/39.463, 39.12
See application file for complete search history.

(56) References Cited

U.S. PATENT DOCUMENTS

| | | | |
|---|---|---|---|
| 4,064,699 A | 12/1977 | Martz | |
| 4,387,560 A | 6/1983 | Hamilton et al. | |
| 4,472,936 A * | 9/1984 | Uchiyama et al. | 60/773 |
| 4,729,217 A | 3/1988 | Kohlofer | |
| 4,976,101 A | 12/1990 | Schiffers | |
| 5,050,375 A | 9/1991 | Dickinson | |
| 5,685,138 A | 11/1997 | Rao et al. | |
| 5,740,673 A * | 4/1998 | Smith et al. | 60/783 |
| 6,385,960 B1 | 5/2002 | Kress et al. | |
| 6,502,402 B1 | 1/2003 | Smith et al. | |
| 6,584,778 B1 * | 7/2003 | Griffiths et al. | 60/782 |
| 6,588,212 B1 | 7/2003 | Wallace et al. | |
| 6,691,519 B2 | 2/2004 | Little | |
| 6,824,575 B1 | 11/2004 | Otomo et al. | |
| 6,889,506 B2 | 5/2005 | Grewe et al. | |
| 7,013,648 B2 * | 3/2006 | Griffin et al. | 60/737 |
| 7,207,323 B1 * | 4/2007 | Hemsath | 123/568.11 |
| 7,565,792 B2 * | 7/2009 | Tanaka et al. | 60/39.281 |
| 7,565,805 B2 * | 7/2009 | Steber et al. | 60/776 |
| 7,596,939 B2 * | 10/2009 | Kataoka et al. | 60/39.281 |
| 2003/0150216 A1 * | 8/2003 | O'Beck et al. | 60/775 |
| 2004/0011057 A1 | 1/2004 | Huber | |

FOREIGN PATENT DOCUMENTS

| | | |
|---|---|---|
| EP | 0 384 781 A1 | 8/1990 |
| EP | 0580910 A1 | 2/1994 |
| EP | 1 058 075 A1 | 12/2000 |
| WO | WO 92/15775 A1 | 9/1992 |
| WO | WO 94/16210 A1 | 7/1994 |
| WO | 9855811 A1 | 12/1998 |
| WO | 03023214 A1 | 3/2003 |

* cited by examiner

*Primary Examiner*—William H Rodríguez
*Assistant Examiner*—Andrew Nguyen

(57) ABSTRACT

A system and method for operating an integrated gasification combined cycle (IGCC) gas turbine system that utilizes the fuel stream as a means of controlling the operation of the IGCC to achieve a target output and efficiency. The methods and systems enable the IGCC to be operated at reduced output, but without a corresponding drop in efficiency as compared to prior art gas turbine systems. Conversely, the IGCC may be operated at higher outputs. The methods and systems achieve the target output and efficiency by adjusting the chemical potential energy, sensible energy, or both of a fuel stream entering the combustion turbine. The chemical potential energy and sensible energy may be manually or automatically controlled.

15 Claims, 6 Drawing Sheets

IGCC DESIGN AND OPERATION FOR MAXIMUM PLANT OUTPUT AND MINIMUM HEAT RATE

FIELD OF THE INVENTION

The present invention is directed generally to gas turbine systems, and more particularly to integrated gasification combined cycle gas turbine systems.

BACKGROUND OF THE INVENTION

The utilization of coal in the prior art has been minimized due to undesirable emissions, such as oxides of nitrogen and sulfur, particulate emissions and greenhouse gases such as carbon dioxide. As a result, there have been efforts to reduce these emissions and improve fuel efficiency of coal plants.

One of the systems that have been developed is the Integrated Gasification Combined Cycle (IGCC) system for use in power generation. IGCC systems were devised as a way to use coal as the fuel source for a gas turbine plant. IGCC systems are clean and generally more efficient than conventional coal plants.

IGCC is a combination of two systems. The first system is coal gasification, which uses coal to create a clean-burning synthetic gas ("syngas"). The gasification portion of the IGCC plant produces syngas, which may then be used to fuel a combustion turbine. In the gasifier coal is combined with oxygen to produce syngas, hydrogen and carbon monoxide. The syngas may then be cleaned by a gas cleanup process. After cleaning, the syngas may be used in the combustion turbine to produce electricity.

The second system is a combined-cycle, or power cycle, which is an efficient method of producing electricity commercially. A combined cycle includes a combustion turbine/generator, a heat recovery steam generator (HRSG), and a steam turbine/generator. The exhaust heat from the combustion turbine may be recovered in the HRSG to produce steam. This steam then passes through a steam turbine to power another generator, which produces more electricity. A combined cycle is generally more efficient than conventional power generating systems because it re-uses waste heat to produce more electricity.

IGCC systems offer several advantages over current conventional coal-based power generation systems. One advantage is reduced emissions. Another aspect of IGCC plants is that emissions clean-up, including removal of sulfur and carbon dioxide, may be effected upstream of the combustor system in the fuel stream. Since this stream is far smaller than the entire flue stream, emissions removal equipment for an IGCC plant are smaller and require less capital expenditure than a conventional coal plant of like output.

IGCC systems offer other advantages, such as higher efficiency, less coal used, higher turbine outputs, and the production of additional chemical by-products, such as hydrogen, which may be used as an alternative source of energy in other developing technologies.

Nevertheless, IGCC systems still suffer from some disadvantages when compared to other systems. For instance, since syngas has a significantly lower heating value than other fuels, IGCC systems require more syngas to produce a selected turbine operating temperature.

Another disadvantage is that IGCC plants are normally designed to operate at a design operation point for output and efficiency. Accordingly, plant systems, components, and controls are structured to meet a design operation point for fuel stream temperature and heating value that deliver the design operation point output and efficiency. This lack of flexibility causes conventional IGCC power plants to reduce output, i.e. part load the gas turbine, by partially closing the Inlet Guide Vanes (IGVs), reducing the firing temperature of the combustor, or a combination of both. Both of these control mechanisms result in a reduction of IGCC efficiency at power output levels less than the design operation point.

Accordingly, it would be beneficial to provide a coal-based power generation system that has increased efficiencies as compared to prior art systems. It would also be beneficial to increase the operating capabilities of the IGCC to increase operational flexibility for IGCC gas turbine systems. It would also be helpful to provide an IGCC plant that offers increased efficiency at reduced output levels and provides improved operational flexibility compared to prior art systems.

SUMMARY OF THE INVENTION

The invention is directed to an integrated gasification combined cycle (IGCC) gas turbine system having a design operation point for the chemical potential energy and the sensible energy of the fuel stream entering the combustion turbine. The IGCC system of the present invention achieves the target output, efficiency, or both by adjusting the fuel stream chemical potential energy, sensible energy, or both. The IGCC system utilizes the fuel stream to control the operation of the IGCC gas turbine system to achieve a target output or efficiency. The IGCC system may operate at a part load without a corresponding drop in efficiency as found in conventional gas turbine systems. Additionally, an IGCC system of the invention may operate at higher outputs. These fuel stream energy characteristics may be manually or automatically controlled to achieve the target output, efficiency, or both.

In particular, the present invention provides a method for determining operating parameters for an integrated gasification combined cycle gas turbine including the steps of determining a target output or efficiency for an integrated gasification combined cycle gas turbine, selecting a chemical potential energy value or sensible energy value capable of affecting the total energy of the fuel stream, and adjusting the chemical or sensible energy value of the fuel stream to achieve the target output or efficiency.

In another embodiment, the present invention provides an integrated gasification combined cycle gas turbine system including a combustor, a turbine, and a fuel stream having a design operation point for the chemical potential energy or the sensible energy of the fuel stream. The fuel stream may be combusted in the combustor and expanded in the turbine to generate power output, and the IGCC system may include a mechanism for adjusting the chemical potential energy or the sensible energy of the fuel stream prior to entry into the combustor.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

As shown in FIGS. 1-6, the present invention is directed to a, IGCC gas turbine system 10 and a method of determining a target output and a target efficiency of the IGCC system 10 and adjusting one or more fuel energy characteristic to achieve the target output and a target efficiency. As used herein, "fuel energy characteristic" refers to both the chemical potential energy and the sensible energy of the fuel.

Figure 1:
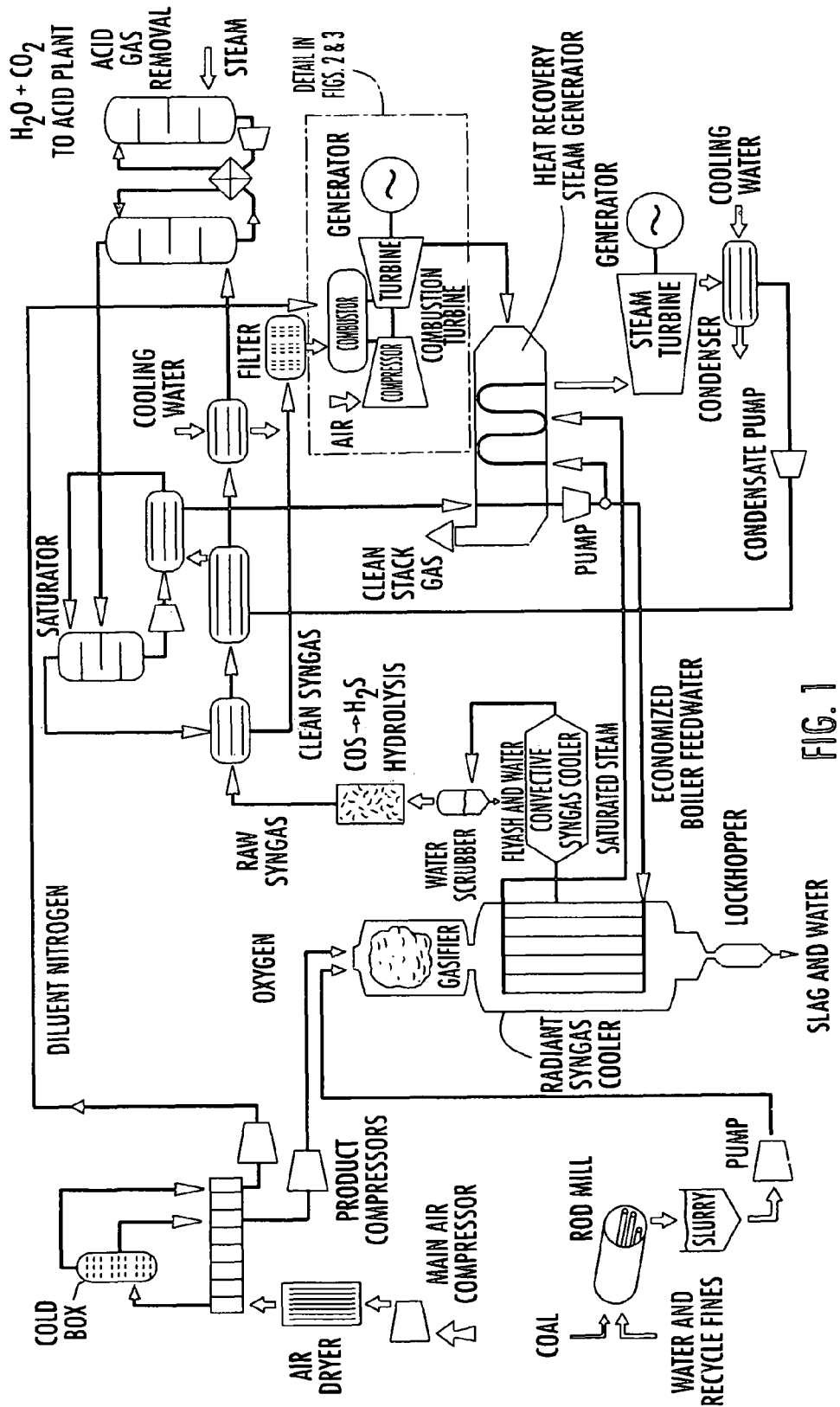
FIG. 1 is a schematic diagram of a conventional IGCC plant.

An IGCC system, as depicted in FIG. 1, may be designed to operate at a design operation point for the temperature and heating value of the fuel entering the combustor. Accordingly, plant systems, components, and controls are structured to meet the design operation point temperature and heating value. Because syngas has a heating value that is roughly $\frac{1}{10}^{th}$ that of natural gas diluted to meet gas turbine (GT) requirements, more fuel is generally needed to operate a gas turbine at the design operation point turbine temperature in an IGCC plant. For a gas turbine in an IGCC plant, the fuel flow rate may constitute up to about 25% of the total flow through the engine, as compared to approximately 2% of the total flow rate in a natural gas fired gas turbine.

As shown by the present invention, the total fraction of syngas to gas turbine airflow may be changed by varying the temperature or heating value of the fuel. For instance, varying the temperature of the fuel entering the gas turbine has an appreciable impact on the amount of fuel used to achieve the selected engine firing temperature, hence on plant output and plant efficiency. Similarly, the plant output can be appreciably impacted by varying the heating value of the fuel entering the gas turbine. Due to the impact of the temperature or heating value of the fuel, these fuel energy modification characteristics may each be adjusted to attain a target output or efficiency for an IGCC system.

In one embodiment, the target output or efficiency of the IGCC may be achieved by adjusting the chemical potential energy or the sensible energy of the fuel stream. In one embodiment, such as when temperature is used to adjust the sensible energy of the fuel stream, the systems and methods of the present invention may include mechanisms for heating and/or cooling of the fuel stream to a target temperature. The mechanism for adjusting the temperature of the fuel stream may be a closed system heat exchanger, an electrical heating device, an electrical refrigeration device, or a mixing valve for combining the fuel stream with a mixing stream.

Figure 2:
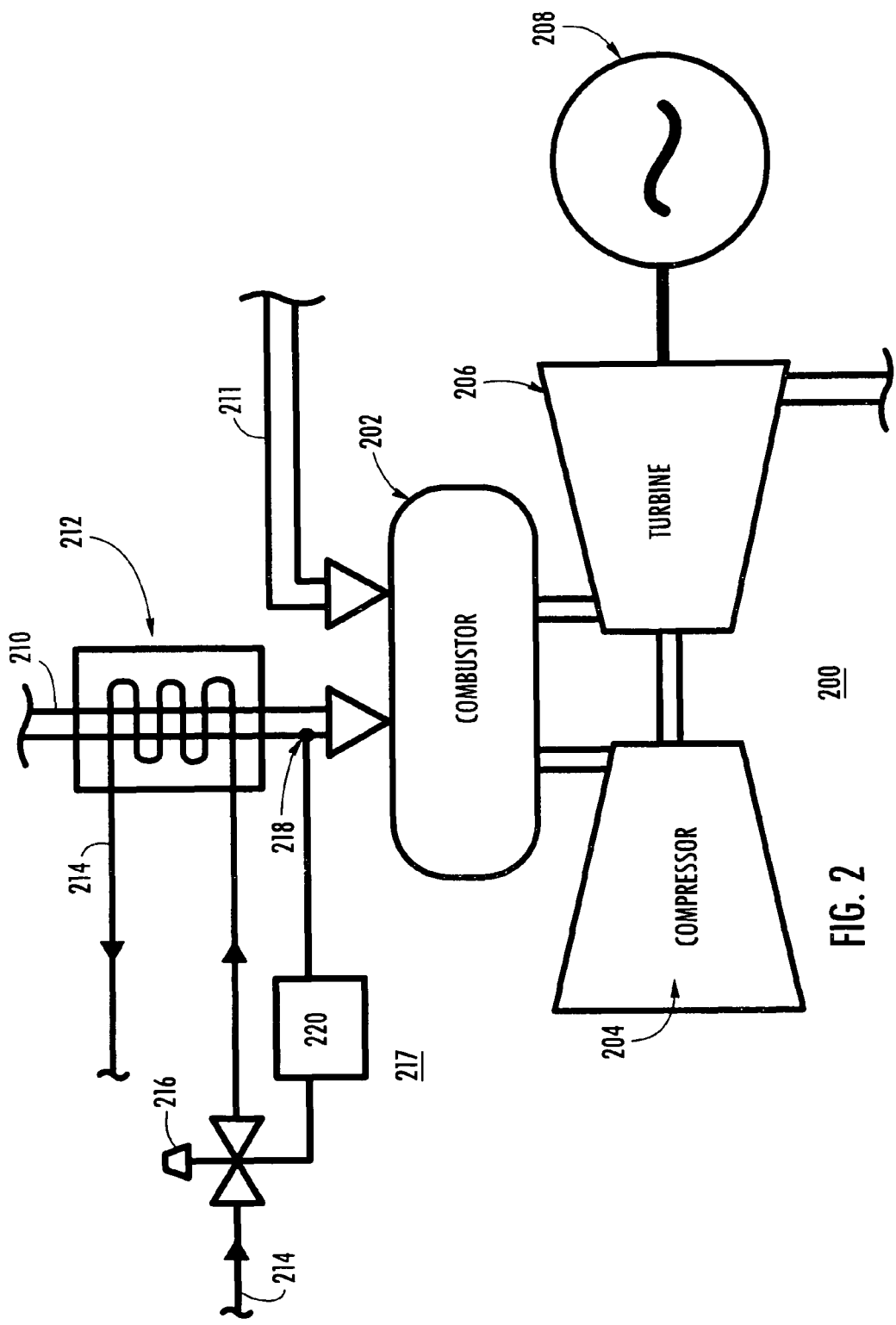
FIG. 2 is a schematic diagram of the combustion turbine portion of an IGCC plant incorporating an aspect of the present invention taken at line 2-2 in FIG. 1.

FIG. 2 shows a combustion turbine 200 of the present invention that may include a combustor 202, a compressor 204 and a turbine 206 that is connected to a generator 208. There may be a fuel stream 210 and a direct injection stream 211 entering the combustor 202. Prior to injection into the combustor 202, the fuel stream 210 passes through a closed system heat exchanger 212. An exchanger stream 214 is supplied to the heat exchanger 212 to supply a fluid for heating or cooling. The flow rate of the exchanger stream 214 is controlled by a control valve 216.

The heat exchanger 212 may be controlled by an automatic control system 217. Such an automatic control system may include a sensor 218 for measuring a fuel energy characteristic of the fuel stream 210, a processor 220, and a means of controlling the flow rate of the exchanger stream 214. In one embodiment, the sensor 218 may be placed downstream of the heat exchanger 212. The sensor 218 may be connected to the processor 220, which adjusts the control valve 216 to achieve the desired value of the fuel energy characteristic being measured.

In one embodiment, the fuel stream 210 may be heated. A closed system heat exchanger 212 may heat the fuel stream 210 using an exchanger stream 214 containing a heated fluid including, but not limited to, syngas from the gasifier, steam, water, air, nitrogen, HRSG flue gas, syngas combustion and combinations thereof. In these embodiments, the IGCC systems may include one or more heating mechanisms as needed to achieve the selected degree of fuel stream 210 heating.

In another embodiment, the fuel stream 210 is cooled using a closed system heat exchanger 212 and an exchanger stream 214 containing a cooling fluid such as, but not limited to nitrogen gas, air, water, coolant, or a combination thereof. In such embodiments, the IGCC systems 10 may include one or more heat exchangers or other cooling mechanisms as needed to achieve the selected degree of fuel stream cooling. Alternatively, the IGCC system 10 may include one or more heating heat exchangers and one or more cooling heat exchangers such that the temperature of the fuel stream 210 may be easily adjusted depending on the target output or efficiency for the IGCC.

Figure 3:
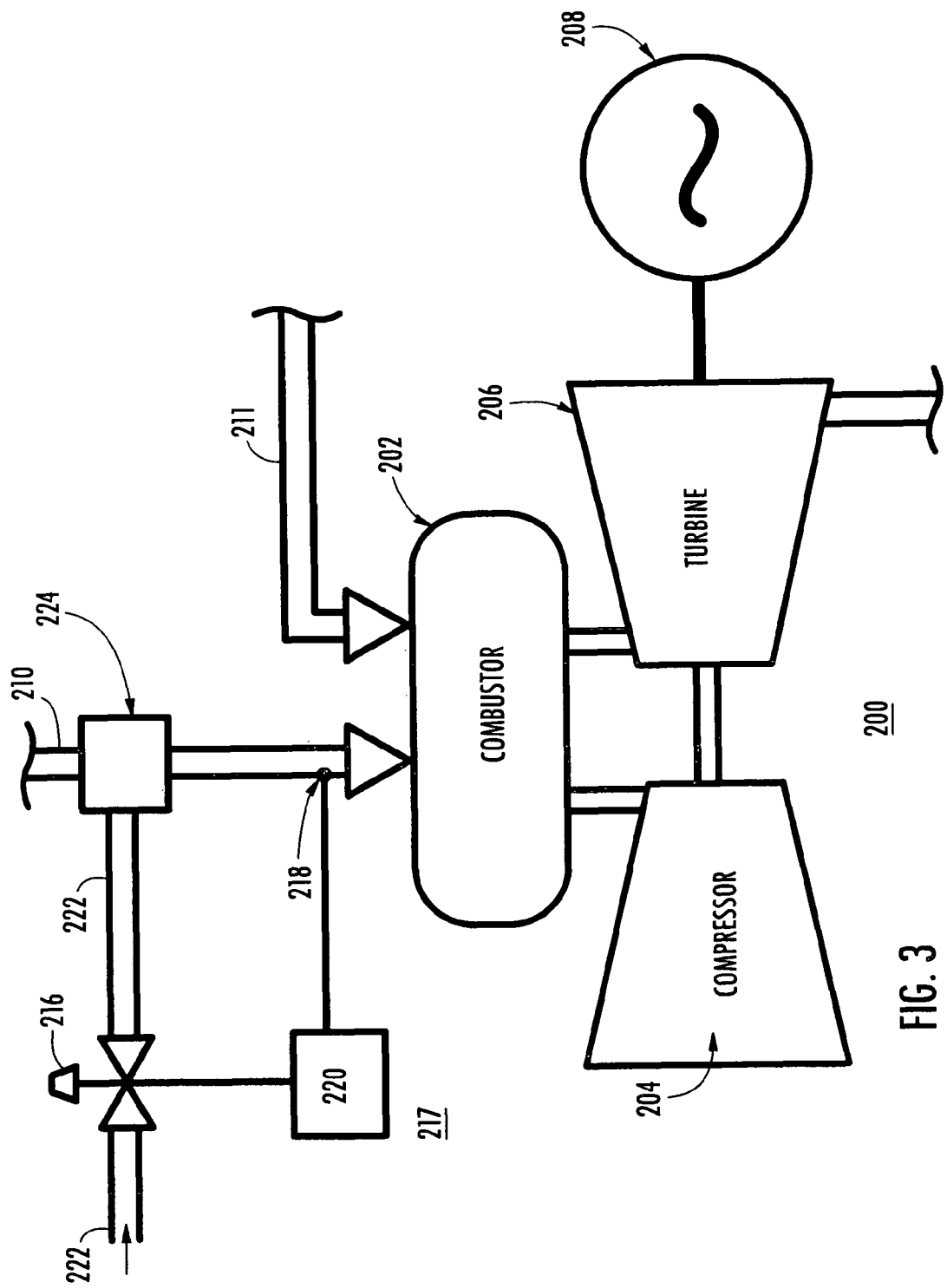
FIG. 3 is a schematic diagram of the combustion turbine portion of an IGCC plant incorporating another aspect of the present invention.

FIG. 3 shows an alternative embodiment of the combustion turbine 200 of the present invention and may include a combustor 202, a compressor 204 and a turbine 206 connected to a generator 208. A fuel stream 210 and a direct injection stream 211 may be directed to the combustor 202. Prior to injection into the combustor 202, the fuel stream 210 may be combined with a mixing stream 222 using a mixing valve 224. The flow rate of the mixing stream 222 may be controlled by a control valve 216.

The mixing rate may be controlled by an automatic control system 217. Such an automatic control system 217 may include a sensor 218 for measuring a fuel energy characteristic of the fuel stream 210, a processor 220, and a means of controlling the flow rate of the exchanger stream 214. In one embodiment, a sensor 218 for measuring a fuel energy characteristic of the fuel stream 210 may be placed downstream of the mixing valve 222. The sensor 218 may be connected to a processor 220, which adjusts the control valve 216 to achieve the desired value of the fuel energy characteristic being measured.

In another embodiment, the fuel stream 210 may be heated or cooled by mixing it, for instance using a mixing valve 224, with a mixing stream 222. The mixing stream 222 may include gases such as, but not limited to, syngas, natural gas, nitrogen, steam, water, or a combination thereof. The IGCC system 10 may include one or more mixing valves 224 to provide better control of heating, cooling or both, over a broader range of temperatures.

In another embodiment, heating of the fuel stream may be accomplished in a number of ways, including preheating of a mixing stream 222 containing fuel, a diluent, or both upstream of the mixing valve 224. The same effect may be accomplished by preheating a direct injection stream 211, such as a nitrogen stream, before being injected it into the combustors. Any of these heating methods may be used alone or in combination.

In general, the methods and systems of the present invention includes an IGCC system 10 that is capable of supporting various modes of operation, such that sufficient fuel production facilities exist, sufficient fuel stream coolers, heaters or both, are available, sufficient supplies of diluent are available, flexible combustors are in place, and/or a combination thereof. In another embodiment, an automatic control system 217 may be included that provides for targeting of the desired fuel stream temperature and heating value in order to operate the plant across a wide range of output levels.

The IGCC system 10 may be controlled as follows to support various operation goals:

| Plant Operation Goal | Fuel Temperature |
|---|---|
| Maximum plant output | Minimum |
| Intermediate output and efficiency | Intermediate |
| Maximum plant efficiency | Maximum |

Figure 4:
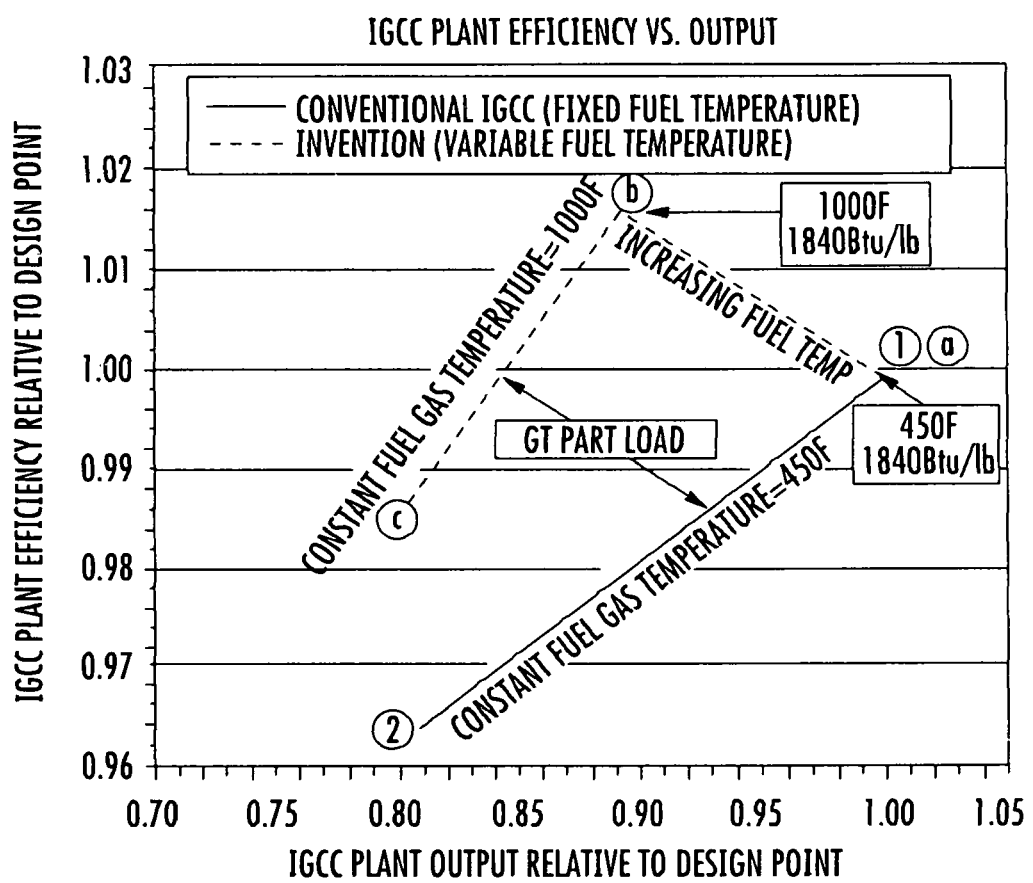
FIG. 4 is a graphical representation of estimated IGCC plant efficiency versus plant output for various fuel temperature control schemes.

Referring now to FIG. 4. The point labeled 1 and "a" represents the design output and efficiency of a typical IGCC plant. In the present invention, operation of the plant at reduced output may be accomplished by increasing the temperature of the fuel stream entering the gas turbine, as shown by the line between Point a and Point b in FIG. 4. This causes an increase in plant efficiency at an output below the design output. Operating the gas turbines at an increased fuel temperature then further reducing the load, such as shown by the line between Point b and Point c in FIG. 4, results in improved efficiency at the same output relative to part loading at the temperature design operation point, such as shown by the line between Point 1 and Point 2 in FIG. 4. Therefore, unlike prior art systems wherein part loading results in reduced efficiencies as well as reduced outputs, the methods of the present invention delivers a target output below the design operation point output with a higher efficiency than using traditional part loading methods. In addition, the methods of the present invention may deliver a target output below the design operation point output with a higher efficiency than the design operation point efficiency.

In another embodiment, the chemical potential energy of the fuel stream 210 may be adjusted by adjusting the heating value of the fuel stream 210. In this embodiment, the system 10 of the present invention may increase, decrease or both, the heating value of the fuel stream 210. Referring to FIG. 3, one method of adjusting the heating value of the fuel stream 210 includes combining the fuel stream 210 with a mixing stream 222 prior to injecting the fuel stream 210 into the combustor 202. Accordingly, in these embodiments, the IGCC system 10 may be capable of increasing, decreasing or both, the heating value of the fuel stream 210. In an embodiment of the present invention, the IGCC system 10 may also be capable of adjusting the fuel stream temperature as previously described.

The fuel stream heating value may be adjusted using a mixing stream that includes a fluid. In particular, the fluid stream heating value may be adjusted as follows: including, but not limited to, one or more of the following: the addition to the fuel stream of diluent streams such as nitrogen, water, steam, other diluents or a combination thereof; and the addition to the fuel stream of combustible fluids such as natural gas, raw syngas, other combustible fluids, or a combination thereof. In addition, the heating value of the fuel stream may be adjusted by varying the gasifier processes, such as post-gasification water-gas shift. Combinations of one or more of the above methods for adjusting the heating value of the fuel may also be used as part of the present invention.

The present invention may include a control system that provides for adjustment to the target heating value, temperature or both of the fuel stream. The control system may also include operation of the plant across a wide range of fuel stream heating values and temperatures.

The IGCC fuel gas heating value and temperature adjustment system may be controlled as follows to achieve target output, efficiency, or both:

| Plant Operation Goal | Fuel Temperature | Fuel Chemical Heating Value |
|---|---|---|
| Maximum plant output | Minimum | Minimum |
| Intermediate output and efficiency | Intermediate | Intermediate |
| Maximum plant efficiency | Maximum | Maximum |

Figure 5:
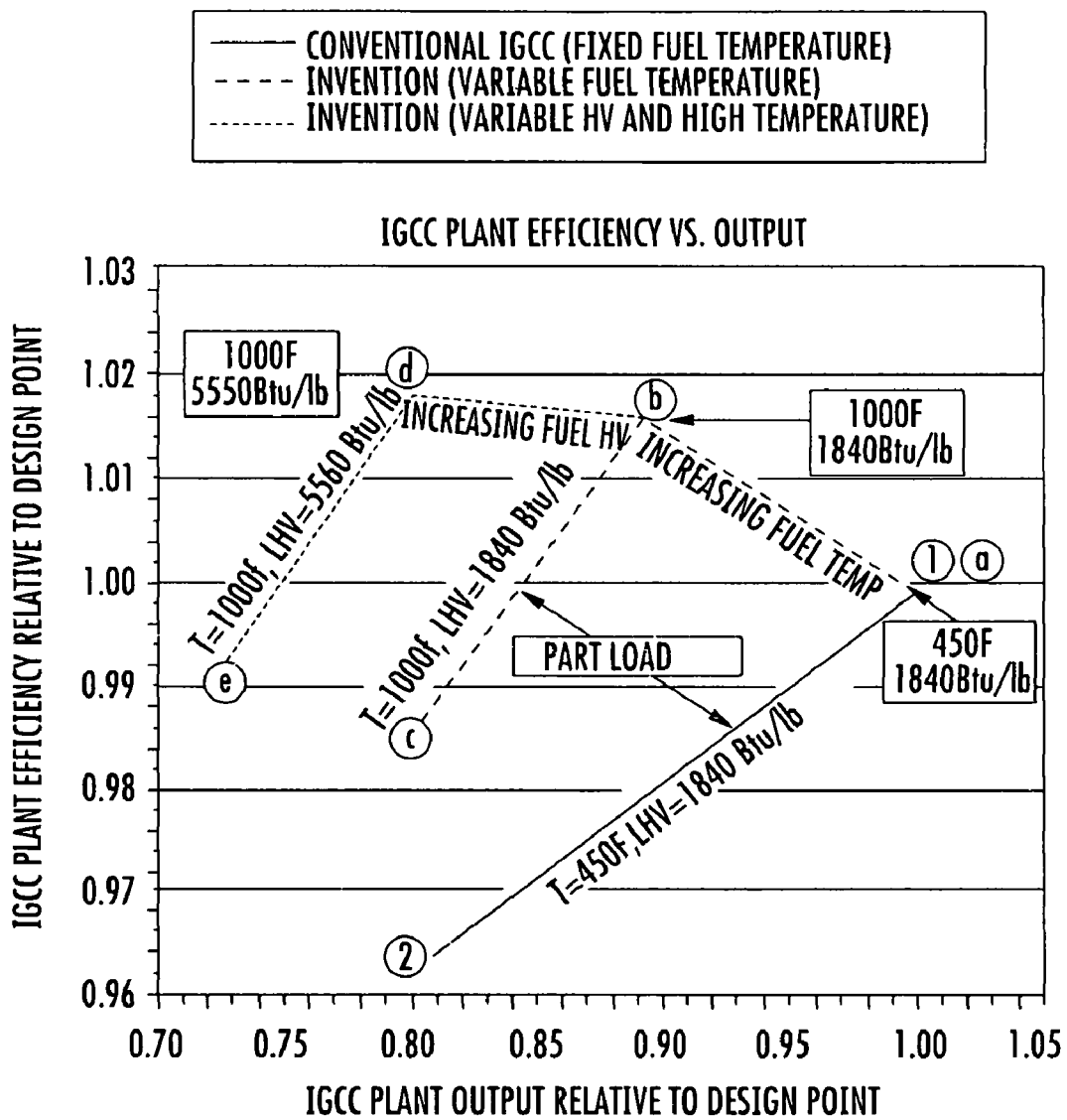
FIG. 5 is a graphical representation of estimated IGCC plant efficiency versus plant output for various fuel heating value and temperature control schemes.
Figure 6:
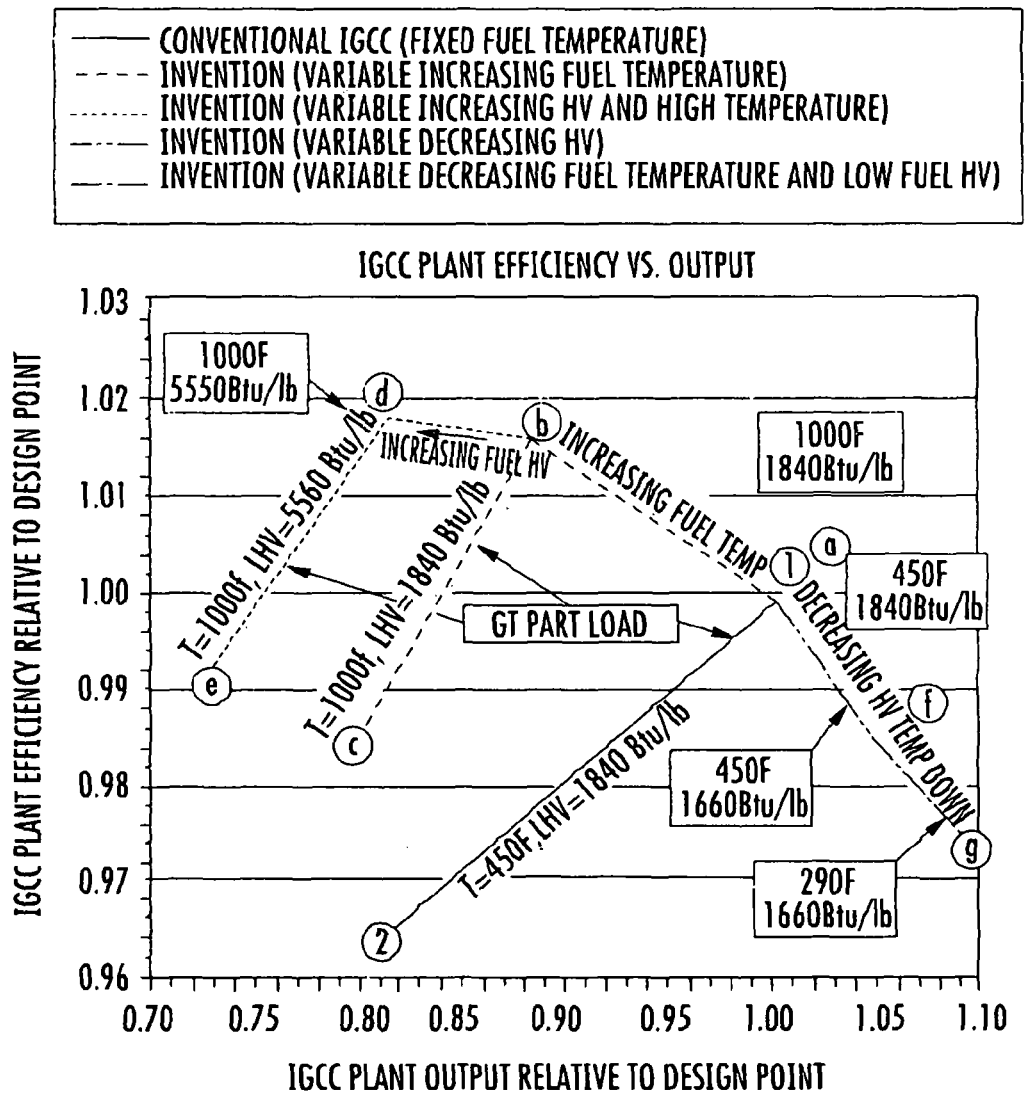
FIG. 6 is a graphical representation of estimated IGCC plant efficiency versus plant output for various fuel heating value and temperature control schemes, including lower fuel temperature and heating value.

As shown in FIG. 5, using a fuel temperature adjustment, it is possible to achieve an efficiency improvement over a certain range of reduced plant outputs. By increasing the fuel heating value, either alone or in addition to the temperature, it is possible to maintain high efficiency levels for yet further reduced loads. This may be accomplished by increasing the fuel heating value, as shown by the line in FIG. 5 between Point b and Point d. Increasing the fuel heating value of the fuel stream decreases the fuel mass flow required to maintain the desired turbine inlet temperature. This reduction in mass flow rate equates to lower gas turbine and steam turbine output levels. By reducing output through a heating value adjustment, it is possible to forestall the onset of engine part loading, thus producing higher efficiencies compared to those of a partially loaded plant. The operation of the plant at a target output level below the design operation point output with increased fuel stream temperature and heating value, as shown by the line between Point d and Point e in FIG. 5, may be more efficient than operation with an increased fuel stream temperature at the design operation point heating value, as shown by the line between Point b and Point c in FIG. 5. In addition, reduced output operation of a plant at a target output level with an increased fuel stream temperature and increased fuel stream heating value may be more efficient than operation at the design operation point for heating value and temperature using conventional partial load approaches, as shown by the line between Point 1 and Point 2 in FIG. 5.

As with those embodiments wherein fuel temperature is the fuel modification characteristic, the methods and systems of the present invention include an IGCC that is capable of supporting various modes of operation, such that fuel blending systems, combustors, fuel heating systems, or a combination thereof may be provided as needed. As discussed, the IGCC system may include mechanisms that adjust the heating value, the temperature, or both, of the fuel stream, or a plurality of mechanisms for adjusting these properties of the fuel stream.

It should also be recognized that by controlling the heating value of the fuel stream by mixing the fuel stream with other substances, changes to the emissions production rates resulting from combustion in the gas turbine may be effected. In general, as more diluents are added, the size of the fuel flow increases. In addition,: because the amount of flow through the combustor and turbine increase more gas is being expanded in the turbine and the output of the turbine increases.

In another embodiment of the present invention, the systems and methods of the present invention contemplate a syngas fuel system that enables reduction of the heating value, the temperature or both, of the syngas. As may be seen in FIG. 6, by reducing the heating value of the fuel stream, it is possible to achieve an increase in plant output, as shown by the line between Point a and Point f in FIG. 6. It is possible to further increase the plant output by reducing the fuel temperature in addition to the heating value, as shown by the line between Point f and Point g in FIG. 6.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method for operating an integrated gasification combined cycle gas turbine having a design operation point for a chemical potential energy of a fuel stream, comprising:
    operating an integrated gasification combined cycle gas turbine at a design operation point output and efficiency;
    determining a target output and target efficiency, whereby at least one of the target output and the target efficiency is different than the design operation point output and efficiency of the integrated gasification combined cycle gas turbine; and
    adjusting a chemical potential energy of a fuel stream during operation of the integrated gasification combined cycle gas turbine by changing a heating value of the fuel stream to achieve the target output or target efficiency;
    wherein changing the heating value of the fuel stream comprises at least one of:
        a) increasing the heating value of the fuel stream and decreasing a flow rate of the fuel stream to effect at least one of a decrease in output or an increase in efficiency of the integrated gasification combined cycle gas turbine; and
        b) decreasing the heating value of the fuel stream and increasing a flow rate of the fuel stream to effect at least one of an increase in output or a decrease in efficiency of the integrated gasification combined cycle gas turbine.

2. The method of claim 1, further comprising:
    measuring a fuel energy characteristic of the fuel stream; and
    adjusting the chemical potential energy of the fuel stream in response to the measured fuel energy characteristic to achieve the target output or target efficiency.

3. The method of claim 1, wherein the heating value of the fuel stream is adjusted by mixing the fuel stream with a mixing stream having a heating value different from the heating value of the fuel stream.

4. The method of claim 3, wherein the mixing stream comprises a fluid selected from the group consisting of nitrogen, water, steam, natural gas, synthesis gas, and combinations thereof.

5. A method for operating an integrated gasification combined cycle gas turbine having a design operation point for a sensible energy of a fuel stream, comprising:
    operating an integrated gasification combined cycle gas turbine at a design operation point output and efficiency;
    determining a target output and target efficiency, whereby at least one of the target output and the target efficiency is different than the design operation point output and efficiency of the integrated gasification combined cycle gas turbine; and
    adjusting a sensible energy of a fuel stream during operation of the integrated gasification combined cycle gas turbine by changing a temperature of the fuel stream to achieve the target output or target efficiency;
    wherein changing the temperature of the fuel stream comprises at least one of:
        a) increasing the fuel stream temperature and decreasing the flow rate of the fuel stream to effect at least one of a decrease in output or an increase in efficiency of the integrated gasification combined cycle gas turbine; and
        b) decreasing the fuel stream temperature and increasing the flow rate of the fuel system to effect at least one of an increase in output or a decrease in efficiency of the integrated gasification combined cycle gas turbine.

6. The method of claim 5, wherein said integrated gasification combined cycle gas turbine has a design operation point for a chemical potential energy comprising a heating value of the fuel stream, further comprising adjusting the chemical potential energy of the fuel stream to achieve the target output or efficiency.

7. The method of claim 5, further comprising:
    measuring a fuel energy characteristic of the fuel system; and
    adjusting the sensible energy of the fuel stream in response to the measured fuel energy characteristic to achieve the target output or efficiency.

8. The method of claim 5, wherein the fuel stream temperature is adjusted by mixing the fuel stream with a mixing stream comprising a gas selected from the group consisting of nitrogen, water, steam, natural gas, synthesis gas, and combinations thereof.

9. The method of claim 5, wherein the fuel stream temperature is adjusted using a closed system heat exchanger and an exchanger stream having a temperature different from the fuel stream.

10. The method of claim 9, wherein the exchanger stream comprises a fluid selected from the group consisting of synthesis gas, steam, nitrogen gas, flue gas, water, air, and combinations thereof.

11. An integrated gasification combined cycle gas turbine system comprising:
    a combustor;
    a turbine;
    a fuel stream having a design operation point for a chemical potential energy comprising a heating value of the fuel stream and a sensible energy comprising a temperature of the fuel stream, the fuel being combusted in the combustor and expanded in the turbine to generate power output;
    a mechanism for adjusting the heating value or the temperature of the fuel stream to a target value different than the design operation point prior to entering the combustor, the target value providing a target output and target efficiency wherein at least one of the target output and target efficiency is different than an output and efficiency for said design operation point; and
    the mechanism for adjusting the chemical potential energy or the sensible energy of the fuel stream comprising a control system including a sensor and processor for sensing a fuel energy characteristic of the fuel stream entering the combustor and changing at least one of the heating value and the temperature of the fuel stream in response to the sensed fuel energy characteristic to change the chemical potential energy of the fuel stream from the design operation point to the target value during operation of the integrated gasification combined cycle gas turbine system;

wherein the target output and target efficiency correspond to a part load operation of the integrated gasification combined cycle gas turbine system having a power output less than the power output at the design operation point.

12. The system of claim 11, wherein the mechanism for adjusting the temperature is a closed system heat exchanger or a mixing valve used to combine the fuel stream with a mixing stream having a temperature different from the fuel stream.

13. The system of claim 11, wherein the mechanism for adjusting the heating value comprises a mixing valve used to combine the fuel stream with a mixing stream having a different heating value than the fuel stream.

14. The method of claim 1, wherein the target output and target efficiency correspond to a part load operation of the integrated gasification combined cycle gas turbine having a power output less than the power output at the design operation point.

15. The method of claim 5, wherein the target output and target efficiency correspond to a part load operation of the integrated gasification combined cycle gas turbine having a power output less than the power output at the design operation point.

* * * * *